J. L. HATCH.

Counter-Stiffeners for Boots and Shoes.

No. 6,534. Reissued July 6, 1875.

Witnesses.

L. H. Latimer.

Wm. Pratt.

Inventor.

James L. Hatch

PER Crosby & Gregory Attys.

N. PETERS, PHOTO-LITHOGRAPHER, WASHINGTON, D. C.

UNITED STATES PATENT OFFICE.

JAMES L. HATCH, OF ROCHESTER, NEW YORK.

IMPROVEMENT IN COUNTER-STIFFENERS FOR BOOTS AND SHOES.

Specification forming part of Letters Patent No. 146,252, dated January 6, 1874; reissue No. 6,534, dated July 6, 1875; application filed April 7, 1875.

*To all whom it may concern:*

Figure 1:
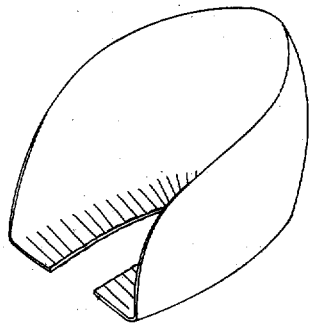
Figure 2:
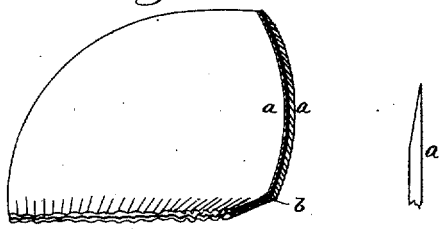
Figure 3:
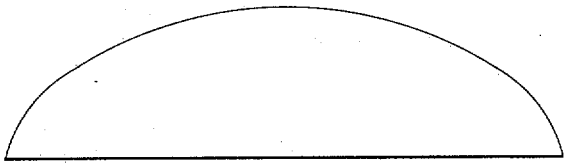

Be it known that I, JAMES L. HATCH, of Rochester, in the county of Monroe and State of New York, have invented an Improvement in Boot and Shoe Stiffeners, of which the following is a specification:

In the drawing, Figure 1 is a perspective view of my improvement. Fig. 2 is a section, and Fig. 3 is a view, of the flat stiffening; and Fig. 4, the edge of the leather-board skived.

In forming boot and shoe stiffeners it is customary to make them in two or more layers, to get the proper body or consistency, and these layers are united by a cement of some kind to hold them together. This cement has been made of paste, in which glue enters as a component part. The use of glue is objectionable for several reasons, the most important of which is, that, when dry, it is exceedingly hard and brittle, and imparts these qualities to the stiffener itself, rendering it very stiff and unyielding, and difficult to fit in place. Furthermore, in crimping or forming the stiffener, it has to be soaked to soften it, and the paste will not adhere. Another objection still is, that in wear, when the stiffener becomes wet the paste will dissolve, thus separating the layers, and causing the stiffener to break down, bend, or become an impediment to the wearer, besides spoiling the appearance of the heel of the boot or shoe.

To obviate these defects is the object of my invention; and it consists in the production of a water-proof stiffener for boots or shoes made of two or more layers of leather-board, or leather and leather-board, laid one over the other, and united by india-rubber cement containing benzine or its equivalent, thus creating between each an elastic and pliable film, in such a manner that a stiffener is produced for the market possessing in an eminent degree such a requisite degree of rigidity and elasticity as to render it pliable and yielding, and so evenly and uniformly does it partake of and retain these qualities that when applied to a boot or shoe it will, with slight wear, assume the contour or shape of the wearer's heel; and, further, the parts are incapable of being disconnected, rumpled, or puckered during wear, either by the motion of the wearer's heel, or the action of perspiration or water.

The drawing shows a stiffener of ordinary form, which may be crimped, molded, or otherwise formed into the desired shape. It may be composed of two or more layers or thicknesses, *a a*, laid one over the other, and united by the cement *b*, and may be made of any material, or combination of different materials—such, for instance, as leather, leather-board, &c.

I first cut the layers of leather and leather-board of proper form from the sheet or from pieces. Then I preferably skive the edges of the leather-board on the side which is to be on the inside of the stiffener. This I do because the rubber will not always adhere sufficiently to the smooth hard surface of the leather-board, and by skiving the edge I am enabled to get a rough surface for the action of the rubber cement, and at the same time the edges of the stiffener are made thin, and yet kept smooth on the outside. Then I spread over the layers of leather and leather-board a layer or coating of india-rubber cement, and leave the layers in this condition until the benzine or equivalent volatile solvent evaporates in a measure, a part of the benzine passing into the layers, leaving the rubber tacky, or as a thin film, and then I lay the layers one against the other, preferably a layer of leather against a layer of leather-board, the rubber-coated faces meeting. The parts, then firmly united, are passed through the crimping or other apparatus, and formed into shape for stiffeners, no wetting or soaking, such as is usually required, being necessary.

The cement consists simply of rubber and benzine, or its equivalent product of the distillation of petroleum.

The advantages of this arrangement are as follows: The parts are cemented more perfectly than by the use of ordinary pastes, and an elastic film is embedded between the layers, which imparts a corresponding elasticity to the whole stiffener, rendering it thereby pliable, yielding, and easily fitted in place by the workman; and these qualities it does not lose, even in long wear. At the same time the stiffener retains all its strength and ability to maintain form, thereby forming a perfect stiffener. By reason of its pliability and capability of yieldingness, it is also much easier to the wearer, and will last much longer.

Another important advantage is, that rubber is insoluble in water, and is therefore water-proof, and never becomes soaked so as to break down; whereas, the ordinary pastes are soluble, and, when wet, lose all their valuable properties, allowing the layers to separate, and the stiffener thus to lose its stiffness and form.

Another important advantage is, that at the time of application the benzine, which is very penetrating, strikes deep into the pores of the layers, and quickly renders the layers as soft and pliable as when long soaked in water, and thereby avoids the necessity of soaking before crimping.

This is of the utmost importance in using leather-board in stiffeners, the leather-board usually requiring some hours' soaking before it can be crimped, and even then is not easily turned without breaking.

By my invention I can form such material into stiffeners without trouble and without breaking, as the material becomes so pliable by the action of the fluid as to be turned or bent in any desired shape. This process overcomes the objection to the use of leather-board in stiffeners, and renders them elastic and pliable.

By this process scraps and waste pieces of leather may be employed in connection or with leather-board, thus making a great saving to manufacturers.

In the old process of pasting, such scraps and waste pieces could not be well used, for the reason that they would not adhere well or make a good stiffener.

Such stiffeners have heretofore been made from the whole sheet or side of leather or of leather-board.

I deem it proper to again reiterate and explain that stiffeners made of two or more layers connected by paste are inefficient for their office, since the paste, on becoming hard, cracks and peels; and further, its presence imparts too great a rigidity to the stiffeners, so much so that they are deprived of the requisite pliability and elasticity, and the consequence is that each layer must be separately crimped or formed prior to being pasted together, for, if they be soaked after being pasted together for crimping or forming, they become disconnected.

By my invention, the stiffener can and is intended to be crimped or formed after the layers are united by the elastic and waterproof film, and I do not soak the parts as the action of the benzine, or equivalent, and india-rubber is such as to permeate the pores of the layers composing the stiffener, and render the entire stiffener soft and pliable, and specially adapted for the mechanical operation of crimping or forming; and further, should it ever be desired to soak my improved stiffener prior to crimping or forming, it can be accomplished without the slightest danger of detaching the parts, since the stiffener is made water-repellent or water-proof.

In a stiffener of leather and leather-board, the leather-board is to give it its principal rigidity, and yet the full thickness of the leather-board at the top of the stiffener would be objectionable, as it would form too abrupt a shoulder, and this is a second reason why it is preferred to skive the leather-board before the piece of thin leather preferably for the inner side of the stiffener is united with the leather-board. When the leather-board is so skived, the thin edge of the leather meets the thin edge of the leather-board, and both together form an edge sufficiently strong and stiff, but not thick enough to be objectionable.

By skiving the bottom or straight edge of the stiffener to form the flange, I am enabled to reduce the thickness of the material where the crimp in the flange is to come, and to prevent the formation of a thick unmanageable flange.

When skiving the leather or leather-board at the top of the stiffener after uniting the layers forming the stiffener, it is found impossible to get a stiffener having at its upper edge a smooth and uniform thickness with a definite, uniform, and smooth edge of leather and leather-board, each mutually supporting the other.

The india-rubber cement forms a film between the layers, and adds to and assists each layer to remain elastic, and the layer of film of rubber cement assists to keep the thin skived upper edge firmly together, and the leather extending fully out to the edge keeps the leather-board from breaking.

Having thus described my invention, I do not claim, broadly, uniting the layers of a boot or shoe stiffener by paste; neither do I claim, broadly, a stiffener for boots or shoes made of two layers or thicknesses of leather or other material; nor do I claim to be the inventor of a cement of caoutchouc, naphtha, and sulphur, for such of themselves are old and well known; but

What I claim as new is—

1. As a new article of manufacture a waterproof stiffening for boots and shoes, composed of leather and leather-board, and an interior or rubber film, substantially as described.

2. A stiffener composed of a layer of leather-board, skived about its edges, and combined with a layer of leather cemented or secured to the skived face of the leather-board by an india-rubber cement or film, substantially as described.

3. The process of forming heel-stiffeners of leather and leather-board, consisting in first skiving the edges of the leather-board, then coating the leather and the skived face of the leather-board with an india-rubber cement, which by penetrating the leather and leather-board, renders them elastic and pliable, then uniting the leather and leather-board, and then forming the stiffener by bending the same into shape, substantially as described.

JAMES L. HATCH.

Witnesses:

WALTER S. NORTH,
JAMES COOPER.